Figure 1:
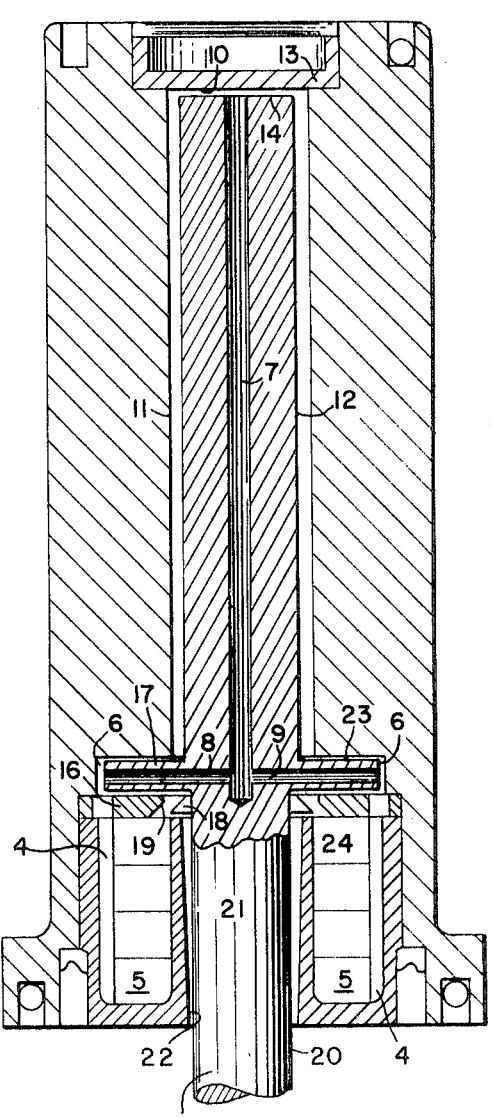

United States Patent

[11] 3,597,026

| [72] | Inventor | John J. Jarosh<br>Santa Monica, Calif. |
|---|---|---|
| [21] | Appl. No. | 21,112 |
| [22] | Filed | Mar. 19, 1970 |
| [45] | Patented | Aug. 3, 1971 |
| [73] | Assignee | Northrop Corporation<br>Beverly Hills, Calif. |

[54] CENTRIFUGALLY PRESSURIZED LIQUID HYDRODYNAMIC BEARING
5 Claims, 2 Drawing Figs.

| [52] | U.S. Cl. | 308/134.1 |
|---|---|---|
| [51] | Int. Cl. | F16c 17/10 |
| [50] | Field of Search | 308/134.1, 168, 172, 169, 9 |

[56] References Cited
UNITED STATES PATENTS
1,157,644  10/1915  London  308/134.1

Primary Examiner—Martin P. Schwadron
Assistant Examiner—Frank Susko
Attorney—Kenway, Jenney & Hildreth ABSTRACT: In a bearing assembly comprising a block housing a flanged shaft, one of which is rotatable while the other is fixed, a fluid bearing is supplied to all spaces between the moving and fixed surfaces by virtue of centrifugal pressure differential during rotation. The rotatable member is provided with a reservoir for the fluid. During rotation, fluid flows from the reservoir to the space between the block and the outer circumference of the flange and then through a fluid passage in the fixed member to a fluid passage along the central axis of the shaft and the space between the block and the end of the shaft in the block.

PATENTED AUG 3 1971

3,597,026

INVENTOR
JOHN J. JAROSH
BY
Kenway, Jenney & Hildreth
ATTORNEY

CENTRIFUGALLY PRESSURIZED LIQUID HYDRODYNAMIC BEARING

CENTRIFUGALLY PRESSURIZED FLUID BEARING

This invention relates to fluid bearings and particularly to means for providing and maintaining a fluid film between moving parts without an external pressure source or external fluid replenishment.

In a fluid bearing, a fluid normally is employed between a rotating surface and a stationary surface to materially reduce friction during rotation, thereby increasing the useful life of the apparatus. The apparatus employing a fluid bearing generally comprises a block and shaft either one of which may be the rotating member. The shaft and the journal housing the shaft are generally provided with a thrust bearing arrangement to restrain or prevent axial movement of the rotating member. During rotation, the pressure of the fluid bearing increases to prevent contact of the stationary and rotating surfaces. It is desirable that the fluid employed as the bearing be supplied from a reservoir within the apparatus.

While various constructions and methods are now employed in an attempt to provide a fluid bearing between the entire surface area of the moving and stationary surfaces their use has suffered disadvantages mainly due to the failure of the fluid to be fully distributed between the two surfaces thereby increasing the probability of contact thereof during use unless frequent external replenishment is provided. The drag on rotation caused by the viscosity of the fluid is another disadvantage encountered when fluid bearings are employed. Generally drag reduction is accomplished by minimizing the journal diameter within which the shaft is housed to thereby reduce the shaft surface area. When the shaft diameter is reduced, the desired thrust of the bearing is maintained by providing a flange on the shaft to form one or more thrust bearing surfaces which cooperates with one or more thrust washers in the stationary section to limit axial movement.

While this general design effects drag reduction and retains desired thrust, it increases the difficulty of distributing fluid throughout the entire space between the rotating and stationary surface. During rotation, the fluid is forced outwardly by centrifugal force from the center of the rotating member. Since the journal within which the flanged thrust bearing fits is larger than the journal within which the shaft fits, the fluid tends to collect along the wall of the journal housing the flange. Consequently, the smaller shaft journal surfaces tend to be deprived of fluid. This materially increases the possibility of damaging the block and shaft surfaces due to friction.

It would be highly desirable to provide means for insuring that sufficient fluid is distributed throughout the entire space between the stationary and moving surfaces to provide an effective fluid bearing especially when incorporating presently employed thrust bearing designs which minimize drag and retain desired thrust. Furthermore, it would be desirable that the fluid be retained within the bearing structure whether the bearing is operating or not, thereby avoiding the necessity of frequent fluid replenishment.

The present invention provides means for distributing fluid throughout the entire space between the moving and stationary surfaces of a bearing block and a shaft under the centrifugal forces normally generated by the rotating portion of the apparatus. This invention is based upon the discovery that the centrifugal forces generated on the fluid while the movable section is rotated are sufficient to effect the desired fluid distribution when suitable fluid passages are provided in the stationary member. The fluid passages connect the journal section where maximum fluid pressure is generated during rotation to a fluid passage along the center of the shaft where little or no fluid pressure is generated due to centrifugal forces. Due to this pressure differential, the fluid is forced into the center of the shaft. A fluid passage is provided from the center of the shaft and in the clearance along the smaller diameter of the journal bearing so that the fluid therein can be recirculated back to the section where maximum fluid pressure is exerted. Shortly after rotation is initiated, the fluid pressure in the fluid passages is substantially equalized. Consequently, any fluid which tends to be removed from a space between the rotating and stationary surfaces is replaced therein under the fluid pressure exerted at the surface of the largest diameter journal by means of the fluid passages provided. A fluid reservoir is provided in the rotating section so that advantage is taken of the centrifugal forces to provide fluid therefrom to the bearings as needed. The present invention provides additional benefits resulting from the construction and location of the self-contained reservoir which reduces fluid loss over long periods and permits the bearing to be stored or run in any position with respect to the direction of gravity.

A further and more complete understanding of the present invention will become evident from the description thereof in terms of the accompanying drawings.

Figure 2:
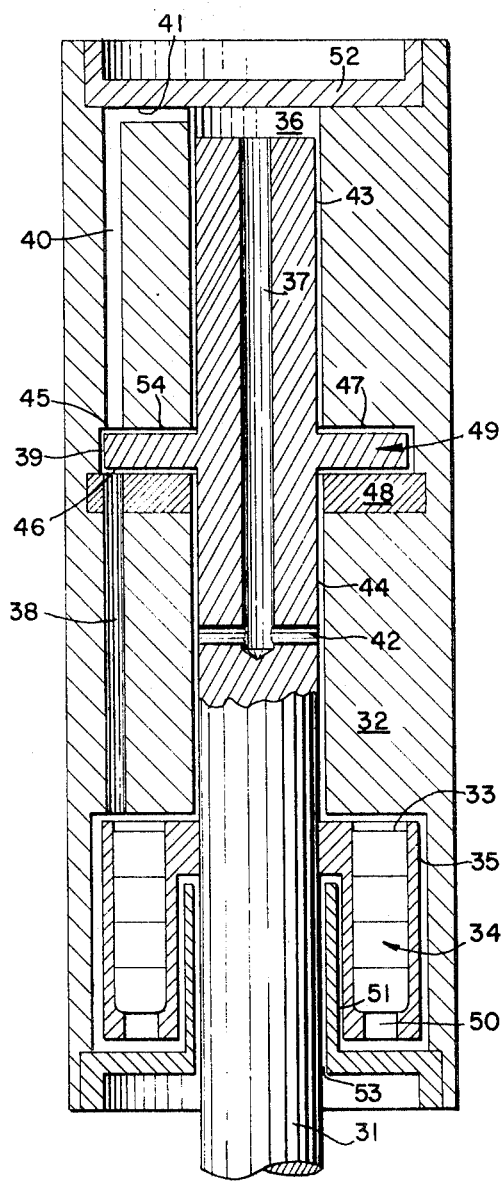

FIGS. 1 and 2 are cross-sectional views of a block and shaft having a thrust bearing.

Referring to FIG. 1, the apparatus is comprised of a rotating block section 1, and a stationary shaft 2. The block 1, is provided with an annular reservoir 4 for storing the bearing fluid. The reservoir 4 is provided with a sponge 5, made from a material adapted to absorb the bearing fluid. When the block 1, is rotated, the fluid is forced out of the sponge 5, into the reservoir 4, and into the annular space 6, because of the centrifugal force generated. During rotation, the maximum fluid pressure is generated on the fluid furthest away from the center of the shaft 2, while no fluid pressure due to centrifugal force is generated at the center of the nonrotating fluid passage 7. Due to the pressure differential between space 6, and passage 7, the fluid will flow from space 6, through passages 8, and 9, to the center of passage 7. Shortly after rotation has commenced, the fluid pressure in all the fluid passages will be substantially equal and fluid flow due to pressure differential will cease. However, when the fluid pressure has equalized, the fluid will tend to flow outward due to centrifugal force. Thus, after fluid pressure becomes equalized, the fluid in passage 7, will tend to flow into space 10, and spaces 11 and 12 to replace any fluid caused to flow under centrifugal force outward in space 23 between flange 17 and adjacent face of block 1. The face of the thrust washer 16 at face of space 24 is grooved with spirals or other designs conforming to common hydrodynamic practice to pump fluid to the inner radius of space 24 against the centrifugal forces caused by rotation of the thrust washer 16. This fluid passes to the bevel passage 19 where centrifugal force impels it to the sponge 5 which absorbs and recirculates it to annular space 6 under the action of the centrifugal forces caused by the rotating reservoir. By virtue of the maximum fluid pressure exerted in space 6 and the pumping action in space 24, any and all spaces between the moving block surface and the stationary shaft surface are filled with fluid.

Furthermore, since the pressure of the fluid in space 10, during operation is substantially equal to that in space 6, sufficient pressure is provided therein to prevent substantial axial movement of the rotating block 1, and prevent contact of the seal plug 13, and shaft surface 14. Similarly, the space 24 between rotating thrust plate 16, and stationary flange 17, is filled with fluid and generates hydrodynamic pressure to oppose the centrifugally generated pressure in space 10. As is common in hydrodynamic thrust washers, the hydrodynamic axial force in space 24 will decrease with slight increases in the axial gap of space 24 so that slight axial movement of the rotating block will increase or decrease the axial force in space 24 until it balances the pressure force in space 10 combined with any external axial load on the rotating block 1, preventing any axial contact between the rotating and nonrotating parts.

The embodiment shown in FIG. 1, also is constructed to prevent fluid leakage regardless of position or whether the block is rotating or stationary. The stationary shaft 2, is provided with an annular baffle 18, beveled to prevent passage of fluid along surface 19, of the shaft 2. Any fluid on surface 16, of the flange 17, is collected in the space between the thrust plate 16, and the baffle 18. Under the centrifugal forces generated during rotation the fluid in the space 19 is forced outward to contact the sponge 5 which absorbs the fluid. No fluid is supplied from the reservoir 4, to the shaft surface 20, and a relatively large annular space 21, is maintained between the surface 15, and the outside annular surface 22, of the reservoir 4 to minimize the possibility of their contacting. With the unit nonrotating and positioned so that seal plug 13 is up, the fluid similarly collects at passage 19 and drips off baffle 18, bypassing the annular space 21 onto the sponge 5 where it is absorbed.

With the unit nonrotating and positioned so that the seal plug 13 is down, the fluid level rises only to the sponge 5, where it is absorbed. With the unit nonrotating and positioned so that the shaft is approximately horizontal, fluid collecting at passage 19 flows circumferentially around the bevel of the baffle 18 to the lowest point where it drips off, bypassing the annular space 21, and is absorbed by the sponge 5.

Referring to FIG. 2, rotatable shaft 31, is placed in stationary block 32. A lubricating fluid is stored in annular reservoir 33, provided with sponge 34, and is attached to shaft 31. During rotation of shaft 31, and reservoir 33, the maximum fluid pressure due to centrifugal force is generated in the annular spaces 35, 39 and is conducted through the stationary fluid passages 38, 40, 41 to space 36. Since the fluid pressure generated by centrifugal force in space 36, and the passages 37 and 42, is less than in spaces 35 and 39 the fluid flows from space 35, through passage 38, space 39, passages 40 and 41, space 36, and passages 37, and 42.

Because of this centrifugal pressure differential, fluid is caused to flow in annular space 43, to replace any fluid caused to flow therefrom through space 47 to space 39, and in annular space 44, to the reservoir 33, recirculating again through passage 38 to space 39. The face of the thrust washer 48 at space 46 is grooved with spirals or other designs conforming to common hydrodynamic practice to pump fluid to the inner radius of space 46 against the centrifugal forces caused by rotation of the flange 49, causing additional flow through space 44 to the reservoir 33 where it is recirculated to spaces 38, 39, etc., so that fluid is maintained in all spaces 54, 43, 49, 46 and 44. No fluid is normally supplied to exit spaces 51 and 53, which are made relatively large to prevent contact.

The pressure in space 36 acts on the shaft 31 to force the flange 49 toward the thrust washer 48. A hydrodynamic axial force is increased in space 46 as a result of the hydrodynamic action of the thrust washer grooves to oppose the pressure in space 36. The pressure in space 46 increases as the axial dimension decreases so that the axial force resulting from the pressure in space 36 coupled with any shaft axial load is equalized by the axial hydrodynamic force in space 46 with only slight axial motion, thereby preventing any axial contact between the rotating and nonrotating parts. When the shaft is rotating, the reservoir 33 rotates with it and effectively prevents fluid from leaking out through passage 51. When the unit is stationary and positioned with the seal plug 52 up, fluid can flow into the reservoir through holes 50 where it is absorbed by the sponge 34 and prevented from flowing upward and out through passage 51. When the unit is stationary and positioned with the seal plug 52 down, the fluid is absorbed by the sponge 34 well before it can rise to holes 50 or flow out through passage 51.

Various modifications or additions can be made to the apparatus of the present invention without departing from the scope thereof. Thus, for example, a second grooved thrust face could be provided to increase the allowable thrust load in that direction or multiple thrust plates could be provided. Furthermore, following common hydrodynamic practice, steps or grooves can be added to the shaft journal to increase the radial load capacity. Also, a restriction may be inserted in the stationary passages 7 and 40 to restrict the flow and reduce pressure at the shaft end (spaces 10 and 36) as desired. In addition the fluid reservoir need not be provided with a sponge; however, the use of the sponge is preferred to minimize leakage from the bearing.

I claim:

1. Apparatus comprising a block and a shaft having a flange, said shaft and flange fitting in a journal in said block so that one end of the shaft extends from the block, either of said block or shaft being rotatable and having a reservoir for a bearing fluid and the other being fixed, a fluid passage connecting said reservoir and the space between the block and the outer circumference of the flange, a second fluid passage in the fixed block or shaft to provide fluid flow between said space and the central axis of the shaft by virtue of centrifugal pressure differential during rotation and a fluid passage along the central axis of the shaft to permit fluid flow between the center of the shaft and the space between the block and the end of the shaft in the block.

2. The apparatus of claim 1 wherein the block is rotatable.

3. The apparatus of claim 1 wherein the shaft is rotatable.

4. The apparatus of claim 1 wherein the reservoir contains a sponge to retain the bearing fluid.

5. Apparatus comprising a rotatable block and a fixed shaft having a flange, said shaft and flange fitting in a journal in said block so that one end of the shaft extends from said block, said block having a reservoir containing a bearing fluid, a fluid passage connecting said reservoir and the space between the block and the outer circumference of the flange, a second fluid passage in the fixed shaft to provide fluid flow between said space and the central axis of the shaft by virtue of centrifugal pressure differential during rotation, a third fluid passage along the central axis of the shaft to permit fluid flow between the center of the shaft and the space between the block and the end of the shaft in the block, a beveled thrust plate in said block and a beveled baffle attached to said shaft, both of said plate and baffle being interposed between said flange and said reservoir and the bevels of said thrust plate and baffle forming a passage from the flange surface to the reservoir to prevent fluid leakage from the journal regardless of position or state of motion of the block and shaft.